UNITED STATES PATENT OFFICE.

GOTTLIEB GOTTFRIED DIESSER, OF ZURICH-WOLLISHOFEN, SWITZERLAND.

SUBSTANCES TO BE USED AS VARNISHES AND FOR IMPREGNATION AND INSULATION AND METHOD FOR THEIR PRODUCTION.

981,178.  Specification of Letters Patent.  Patented Jan. 10, 1911.

No Drawing.   Application filed August 14, 1908.   Serial No. 448,628.

*To all whom it may concern:*

Be it known that I, GOTTLIEB GOTTFRIED DIESSER, a subject of the Emperor of Germany, residing at Zurich-Wollishofen, Switzerland, have invented certain new and useful Substances to be Used as Varnishes and for Impregnation and Insulation and Method for Their Production, of which the following is a specification.

The present invention relates to hitherto unknown substances and to methods for their production, such substances being especially suitable for purposes of manufacturing varnish, for impregnation and insulation. According to this invention, these bodies are formed by chemical reactions between fatty acids or substances containing fatty acids, for instance, fatty oils, and carbohydrates, such as starch, cellulose (oxy- and hydro-cellulose), etc., the reactions being brought about at a temperature exceeding the limit of decomposition of the reacting substances present. The resulting products are remarkably resistant against chemical changes and atmospheric influences. While these new bodies may be used for a variety of purposes, they are to be particularly employed for manufacturing varnishes, lacquers and painting colors, by being to this end added to agglutinants or coloring matters. Moreover the products are intended for electrotechnical uses, as materials for impregnating, as insulating varnishes and insulating solids, these different uses resulting according to the specific kind of material operated upon.

The bodies produced by the foregoing method can be vulcanized by either cold or hot processes. They may be transformed into solids with or without the aid of agglutinants, and in given cases, by catalytic agents.

The following are specific illustrations of the manner in which the new substances may be formed:

Example I: About 5 parts in weight of cellulose (oxycellulose, hydrocellulose) are heated with about 15 parts in weight of raw or boiled linseed-oil or the fatty acids of linseed oil (or wood-oil, or fatty acids of wood-oil, or other oils and the fatty acids contained in them). The heating is continued during 2–4 hours at a temperature exceeding the limit of decomposition of the reacting substances present, *i. e.* at about 280°– 320° C. The volatile products of decomposition are preferably allowed to escape from the heating vessel. The above enumerated substances may also be heated in the autoclave at a temperature exceeding their limits of decomposition or in a current of indifferent gases such as carbon dioxid, illuminating gas, and the like. The product of the reaction may be absorbed by benzol or other solvents, and the solution filtered and purified to a higher degree of purity according to the methods used in the analysis of fats. The solution of the product obtained by a suitable solvent can be used for varnishing, impregnating and insulating purposes; or the product itself can be submitted to subsequent treatment, such as vulcanizing and the like, as already stated.

Example II: 7 parts of starch are heated with 18 parts of fatty acids of linseed-oil, wood-oil, castor-oil or other fatty acids; or of the corresponding fatty oils, in the same manner as set forth in Example I.

It is to be well understood that the experimental conditions need not be always the same as described in the examples. They may be modified by the specialist to suit the individual case.

I claim:

1. A process for manufacturing new substances adapted to be used as varnishes, as materials for impregnation and insulation and the like, consisting in causing fatty acids to react upon cellulose at a temperature exceeding the limit of decomposition of the reacting substances present, substantially as and for the purpose set forth.

2. A process for manufacturing new substances adapted to be used as varnishes, as materials for impregnation and insulation and the linke, consisting in causing substances containing fatty acids to react upon cellulose at a temperature exceeding the limit of decomposition of the reacting substances present, substantially as and for the purpose set forth.

3. A process for manufacturing new substances adapted to be used as varnishes, as materials for impregnation and insulation and the like, consisting in causing fatty acids to react upon cellulose at a temperature exceeding the limit of decomposition of the reacting substances present, the volatile products developed by the said reaction being allowed to escape, substantially as and for the purpose set forth.

4. A process for manufacturing new substances adapted to be used as varnishes, as materials for impregnation and insulation and the like, consisting in causing fatty acids to react upon cellulose under pressure at a temperature exceeding the limit of decomposition of the reacting substances present, substantially as and for the purpose set forth.

5. A process for manufacturing new substances adapted to be used as varnishes, as materials for impregnation and insulation and the like, consisting in causing the fatty acids of linseed oil to react upon carbohydrates at a temperature exceeding the limit of decomposition of the reacting substances present, substantially as and for the purpose set forth.

6. A process for manufacturing new substances adapted to be used as varnishes, as materials for impregnation and insulation and the like, consisting in causing the fatty acids of linseed oil to react upon cellulose at a temperature exceeding the limit of decomposition of the reacting substances present, substantially as and for the purpose set forth.

7. A process for manufacturing new substances adapted to be used as varnishes, as materials for impregnation and insulation and the like, consisting in causing the fatty acids of linseed oil to react upon cellulose derivatives at a temperature exceeding the limit of decomposition of the reacting substances present, substantially as and for the purpose set forth.

8. The herein described new substances adapted to be used as varnishes, as materials for impregnation and insulation and the like, being the products resulting from the reaction of fatty acids upon cellulose under heating.

9. The herein described substances adapted to be used as varnishes, as materials for impregnation and insulation and the like, being the products resulting from the reaction under heating of the fatty acids of linseed oil upon cellulose, the product being soluble in benzol.

In testimony whereof I have hereunto set my hand in presence of two witnesses.

GOTTLIEB GOTTFRIED DIESSER.

Witnesses:
JOSEPH SIMON,
OTTO ILY.